L. A. ABBOTT, Jr.
BEARING ROLLERS.
APPLICATION FILED NOV. 6, 1914.

1,143,479.

Patented June 15, 1915.

Witnesses

Inventor
L. A. Abbott Jr.
By
Attorney

UNITED STATES PATENT OFFICE.

LAWRENCE A. ABBOTT, JR., OF NEWARK, NEW JERSEY, ASSIGNOR OF ONE-THIRD TO HARRY BROWNE AND ONE-THIRD TO FRANK WIEGAND, OF NEWARK, NEW JERSEY.

BEARING-ROLLERS.

1,143,479.

Specification of Letters Patent. Patented June 15, 1915.

Application filed November 6, 1914. Serial No. 870,670.

*To all whom it may concern:*

Be it known that I, LAWRENCE A. ABBOTT, Jr., a citizen of the United States, residing at Newark, in the county of Essex and State of New Jersey, have invented certain new and useful Improvements in Bearing-Rollers; and I do hereby declare the following to be a full, clear, and exact description of the invention, such as will enable others skilled in the art to which it appertains to make and use the same.

This invention relates to bearings and the primary object of the invention is the provision of a bearing roller which will efficiently prevent or absorb end thrust of the bearing and support for rotation within the bearing in practically an anti-frictional manner a shaft or any suitable device.

Another object of this invention is to provide a roller bearing which has a novel form of annular lubricant grooves or ducts formed inwardly of its terminal ends and tapering inwardly toward the center of the bearing so as to force lubricant inwardly toward the center of the bearing during the rotation of the latter for efficiently lubricating the same and preventing the wasting of the lubricant.

With the foregoing and other objects in view this invention consists in such novel features of construction, combination and arrangement of parts as will be hereinafter more fully described, illustrated in the accompanying drawings and claimed.

In describing the invention in detail reference will be had to the accompanying drawings wherein like characters designate like or corresponding parts throughout the several views, and in which:—

Figure 1:
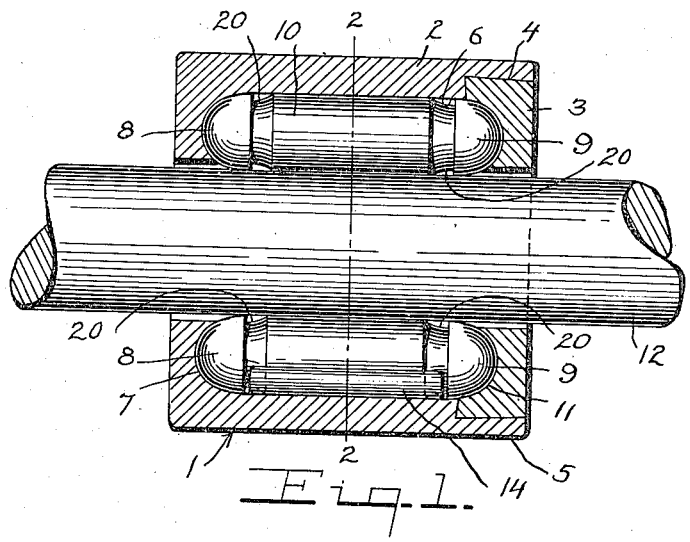
Figure 2:
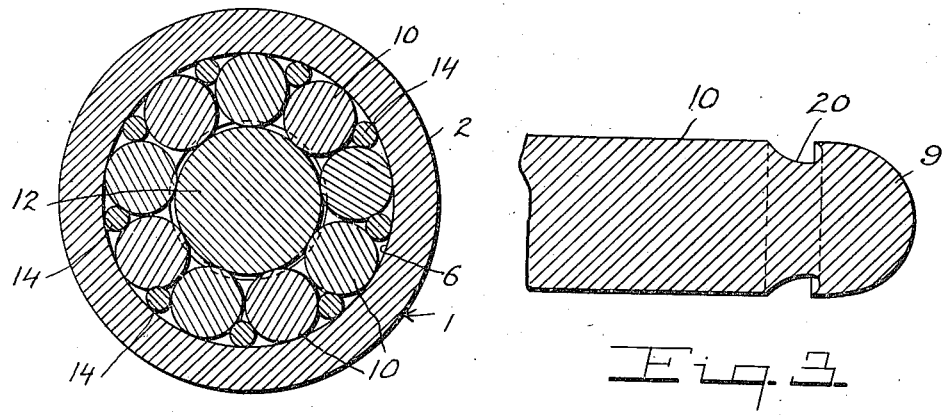
Figure 3:
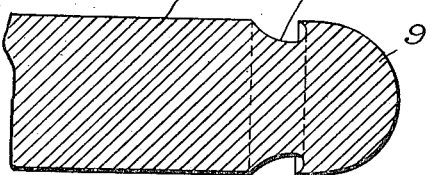

Figure 1 is a longitudinal sectional view through the improved bearing. Fig. 2 is a cross sectional view on the line 2—2 of Fig. 1, and Fig. 3 is a detail central sectional view through one end of one of the improved bearings.

Referring more particularly to the drawings, 1 designates the casing in which the bearings are mounted, which casing is constructed of a sleeve 2 and a collar 3. The sleeve 2 is provided with a facial recess 4 formed in one end thereof, the side walls of which diverge as they extend inwardly, and the inner end walls of the recess 4 tapers or inclines outwardly toward the end of the sleeve 2 as it extends inwardly toward the central axis of the sleeve. The periphery and inner end of the collar 3 are shaped to conform to the shape of the walls of the recess 4 when the collar is seated therein. In forming the casing 1, the sleeve 2 is heated, causing the same to expand, at which time the collar 3 is inserted into the recess 4 and the sleeve is cooled in any ordinary manner, shrinking the section 5 thereof which surrounds the recess 4, firmly upon the periphery of the collar 3 and forming a firm and compact casing as is shown clearly in Fig. 1 of the drawing.

The sleeve 2 has the bore 6 thereof terminating in a channel 7 which channel is substantially semi-circular in cross section and receives the substantially semi-spherical end 8 of the bearing roller 10. The bearing rollers 10 are formed of a single piece of suitable metal formed cylindrically and having their ends rounded for forming substantially semi-spheres as is clearly shown at 8 and 9 in Fig. 1 of the drawings. The semi-spherical ends 8 and 9 of the rollers 10 are provided for absorbing end thrust of the bearings. The collar 3 has a channel 11 formed in the inner face thereof which receives the substantially semi-spherical ends 9 of the bearings 10.

The bearing rollers 10 are disposed in a circle within the bore 6 of the casing 1 for circumferential engagement with the outer surface or circumference of a shaft 12 which is rotatably mounted within the bearings and their function is to eliminate friction during the rotation of the shaft. Pin rollers 14 are positioned within the bore 6 of the casing 1, engaging the inner wall of the bore and being spaced between the rollers 10 as is clearly shown in Fig. 2 of the drawing for holding these rollers in spaced relation to each other and preventing their engagement during their rotation for insuring the efficient lubrication of the bearing.

The rollers 10 have oil or lubricant recesses 20 formed therein at the inner terminals of the substantially semi-spherical ends 8 and 9. The lubricant ducts or recesses 20 are cut inwardly into the inner face or edge of the semi-spherical ends in substantially a half circle and they taper outwardly and upwardly therefrom in an arcuate incline of increased radius over the substantially semi-circular portion formed in the inner ends of the rounded ends 8 and 9 for forcing the lubricant inwardly toward the center of the rollers during the rotation of the same.

In the rotation of the rollers 10 within the casing 1, lubricant which is fed thereinto and normally or naturally runs into the ducts 20 when the rollers are stationary, will upon rotation of the rollers be forced, by centrifugal force, upwardly along the incline of the ducts 20 and into or toward the center of the rollers or bearings causing an efficient lubrication of the bearings. By decreasing the radius of the semi-circular portion of the ducts, a practically abrupt shoulder will be formed which will have a tendency to prevent the lubricant from flying out of the ends of the bearing during its operation.

In assembling bearings constructed in accordance with this invention, the rollers 10 and the pin rollers 14 are properly placed within the bore 6 of the sleeve 2, after which the sleeve is heated and the collar 3 swaged or shrunk therein which properly forms the bearing.

The pin rollers 14 extend longitudinally along the rollers 10 terminating a short distance inwardly from the inner terminals of the semi-spherical ends 8 and 9 as is clearly shown in Fig. 1 of the drawings.

In reducing the invention to practice certain minor features of construction, combination and arrangement of parts may necessitate alterations to which the patentee is entitled provided such alterations are comprehended within the scope of what is claimed.

What is claimed is:—

1. In a bearing structure, bearing rollers being provided with annular lubricant ducts adjacent to their ends, said ducts terminating toward the ends of the rollers in abrupt shoulders and enlarging inwardly toward the center of the rollers in a gradual incline for throwing lubricant inwardly toward the centers of the rollers upon rotation thereof.

2. A bearing roller having tapered ends, and heads formed upon and overlying the smaller portions of said tapered ends.

3. In a bearing structure, the combination with a protective casing, of a plurality of bearing rollers rotatably mounted within said casing, said rollers being provided with annular oil ducts formed therein a short distance inwardly from their terminal ends, said oil ducts terminating toward the ends of said bearing rollers in substantially semi-circular portions and extending inwardly from said substantially semi-circular portions toward the center of said rollers in an arcuate curve of increased radius with respect to said substantially semi-circular portions for feeding lubricant toward the center of said bearing upon rotation of the same.

4. A bearing roller having tapered ends, semi-spherical heads formed upon the outer smaller ends of said tapered ends and overlying them for forming lubricant receiving ducts, said heads forming abrupt shoulders at the outer terminus of said tapered ends for throwing lubricant inwardly over the tapered ends toward the centers of the rollers upon rotation thereof.

5. In a bearing structure, the combination with a casing, of a plurality of bearing rollers positioned within said casing, said bearing rollers having their terminal ends rounded and forming substantially semi-spheres, said casing being provided with arcuate channels for receiving said rounded roller ends, said rollers being provided with lubricant ducts formed therein at the inner terminals of said semi-spherical portions, said lubricant ducts extending into the inner ends of said semi-spherical portions and being substantially semi-circular in shape, said ducts extending inwardly toward the center of said roller from said semi-circular portion in arcuate inclines of increased radius over the substantially semi-circular portions thereof for feeding lubricant inwardly toward the center of said rollers upon rotation of the same, and a plurality of pin rollers spaced within said casing and engaging said bearing rollers for holding them in spaced relation with each other.

6. In a bearing structure, the combination with a casing, of a plurality of bearing rollers positioned within said casing, said bearing rollers having their terminal ends rounded and forming substantially semi-spheres, said casing being provided with arcuate channels for receiving said rounded roller ends, said rollers being provided with lubricant ducts formed therein at the inner terminals of said semi-spherical portions, said lubricant ducts extending into the inner ends of said semi-spherical portions and being substantially semi-circular in shape, said ducts extending inwardly toward the center of said bearing from said semi-circular portion in arcuate inclines of increased radius over the substantially semi-circular portions thereof for feeding lubricant inwardly toward the center of said rollers upon rotation of the same.

In testimony whereof I affix my signature in presence of two witnesses.

LAWRENCE A. ABBOTT, Jr.

Witnesses:
W. C. DAVIS,
ROSE M. SEFTON.